US010079619B2

(12) United States Patent
Cano Rodriguez et al.

(10) Patent No.: US 10,079,619 B2
(45) Date of Patent: Sep. 18, 2018

(54) WIRELESS BATTERYLESS DATA PROCESSING UNIT (71) Applicant: SCHNEIDER ELECTRIC USA, INC., Schaumburg, IL (US)

(72) Inventors: Valdimir Cano Rodriguez, Apodaca (MX); Gerardo Rodriguez Najera, San nicolas de los Garza (MX)

(73) Assignee: SCHNEIDER ELECTRIC USA, INC., Schaumburg, IL (US)

(*) Notice: Subject to any disclaimer, the term of this patent is extended or adjusted under 35 U.S.C. 154(b) by 111 days.

(21) Appl. No.: 15/033,249

(22) PCT Filed: Nov. 26, 2013

(86) PCT No.: PCT/US2013/071866
§ 371 (c)(1),
(2) Date: Apr. 29, 2016

(87) PCT Pub. No.: WO2015/080693
PCT Pub. Date: Jun. 4, 2015

(65) Prior Publication Data
US 2016/0294448 A1  Oct. 6, 2016

(51) Int. Cl.
*H01F 27/42* (2006.01)
*H04B 5/00* (2006.01)
(Continued)

(52) U.S. Cl.
CPC .......... *H04B 5/0037* (2013.01); *G06F 1/182* (2013.01); *G06F 1/189* (2013.01); *H01F 27/24* (2013.01);
(Continued)

(58) Field of Classification Search
CPC .................................................. H04B 5/0037
See application file for complete search history.

(56) References Cited

U.S. PATENT DOCUMENTS 3,701,003 A  10/1972  Anderson
4,262,209 A   4/1981  Berner
(Continued)

FOREIGN PATENT DOCUMENTS

WO  WO2010119332  10/2010
WO  WO2012054337   4/2012

OTHER PUBLICATIONS

International Search Report and Written Opinion dated Apr. 24, 2014 in PCT/US2013/071866, 14pp.

*Primary Examiner* — Daniel Puentes
(74) *Attorney, Agent, or Firm* — Locke Lord LLP (57) ABSTRACT A wireless, parasitically powered data processing unit 1 is fastened to a current carrying conductor 3 without additional tools, by means of a flexible ferromagnetic belt 11 that is clamped by its housing around the conductor and forms a transformer core to concentrate magnetic flux 5 produced by the conductor and provide operational power to a sensor interface 18, a data processing device 16, and a wireless transceiver 22, without the need for batteries. Sensor signals 33 received from local sensors are processed by the data processing device and information derived from the sensor signals is wirelessly transmitted to remote receivers. The sensor signals may represent measurements of the physical condition of the current carrying conductor or another electrical device, for such conditions as temperature, humidity, vibration, or noise.

14 Claims, 4 Drawing Sheets (51) Int. Cl.
   *H01F 27/24*    (2006.01)
   *H01F 27/26*    (2006.01)
   *H01F 38/30*    (2006.01)
   *G06F 1/18*     (2006.01)
   *H01F 38/14*    (2006.01)

(52) U.S. Cl.
   CPC .......... *H01F 27/263* (2013.01); *H01F 38/14* (2013.01); *H01F 38/30* (2013.01); *H01F 2038/305* (2013.01)

(56) References Cited

U.S. PATENT DOCUMENTS

| | | |
|---|---|---|
| 4,660,889 A | 4/1987 | Anthony et al. |
| 5,451,939 A | 9/1995 | Price |
| 5,537,087 A | 7/1996 | Naito |
| 5,877,691 A | 3/1999 | Suptitz et al. |
| 5,892,430 A | 4/1999 | Wiesman |
| 6,018,239 A | 1/2000 | Berkcan et al. |
| 6,034,858 A | 3/2000 | Serpinet et al. |
| 6,137,665 A | 10/2000 | Boudaud |
| 6,188,146 B1 | 2/2001 | Michaels |
| 6,507,262 B1 | 1/2003 | Otte et al. |
| 6,798,209 B2 | 9/2004 | Lavoie et al. |
| 6,842,325 B2 | 1/2005 | Meehleder et al. |
| 6,847,297 B2 | 1/2005 | Lavoie et al. |
| 6,868,349 B2 | 3/2005 | Fletcher et al. |
| 7,102,478 B2 | 9/2006 | Pridmore, Jr. et al. |
| 7,145,322 B2 | 12/2006 | Solveson et al. |
| 7,158,012 B2 | 1/2007 | Wiesman et al. |
| 7,403,015 B2 | 7/2008 | Carlino et al. |
| 7,412,338 B2 | 8/2008 | Wynans et al. |
| 7,417,554 B2 | 8/2008 | Benke et al. |
| 7,436,641 B2 | 10/2008 | Holley |
| 7,579,963 B2 | 8/2009 | Viaro et al. |
| 7,909,508 B2 | 3/2011 | Maloney et al. |
| 8,018,097 B2 | 9/2011 | Saito et al. |
| 8,243,411 B2 | 8/2012 | Larson |
| 8,358,188 B2 | 1/2013 | Bellotto et al. |
| 8,368,500 B2 | 2/2013 | Gilmartin et al. |
| 8,378,663 B2 | 2/2013 | Cadoux et al. |
| 8,487,724 B2 | 7/2013 | Fleege |
| 8,760,825 B2 | 6/2014 | Erger et al. |
| 2001/0052843 A1 | 12/2001 | Wiesman et al. |
| 2002/0191361 A1 | 12/2002 | Houbre |
| 2003/0053279 A1 | 3/2003 | Meehleder et al. |
| 2004/0178875 A1 | 9/2004 | Saito |
| 2005/0275493 A1 | 12/2005 | Yamazaki et al. |
| 2006/0077030 A1 | 4/2006 | Herzer et al. |
| 2006/0176630 A1 | 8/2006 | Carlino et al. |
| 2006/0271314 A1 | 11/2006 | Hayes |
| 2007/0109088 A1 | 5/2007 | Askildsen et al. |
| 2009/0141433 A1 | 6/2009 | Maloney et al. |
| 2009/0167468 A1 | 7/2009 | Dauer et al. |
| 2011/0291488 A1 | 12/2011 | Paik et al. |
| 2012/0038446 A1 | 2/2012 | McBee et al. |
| 2012/0086433 A1 | 4/2012 | Cheng et al. |
| 2012/0123762 A1 | 5/2012 | Studer et al. |
| 2012/0294043 A1 | 11/2012 | Juds et al. |
| 2013/0054162 A1 | 2/2013 | Smith et al. |
| 2013/0066478 A1 | 3/2013 | Smith |
| 2013/0107412 A1 | 5/2013 | Schalk et al. |
| 2013/0108027 A1 | 5/2013 | Kioski et al. |
| 2013/0200971 A1 | 8/2013 | Crutcher et al. |
| 2014/0015516 A1 | 1/2014 | Sorensen et al. |
| 2014/0062459 A1* | 3/2014 | El-Essawy .......... G01R 15/205 324/117 R |
| 2015/0002138 A1 | 1/2015 | Fox |

* cited by examiner

WIRELESS BATTERYLESS DATA PROCESSING UNIT

TECHNICAL FIELD

The present disclosure is generally directed to energy harvesting in power distribution networks.

BACKGROUND

A rise in the operating temperature of a power bus may indicate the presence of corrosion or a loss of integrity at mechanical junctions of the bus, potentially creating an operational failure or safety hazard. In the prior art, the installation of parasitically powered temperature monitoring devices on power buses has required the use of specialized tools and equipment to fasten the rigid mounting components of the devices onto the bus.

SUMMARY

The present disclosure provides an easily installed wireless, parasitically powered data processing unit that may be used for temperature monitoring of a power bus or other current carrying conductor. The wireless, parasitically powered data processing unit employs a flexible ferromagnetic belt that is configured to wrap around a current carrying conductor to secure the data processing unit onto the conductor and to form a magnetic loop to provide a ferromagnetic core for a transformer. The transformer thus formed is used to supply power to the data processing unit from the current carrying conductor, eliminating the need for a battery. The wireless, parasitically powered data processing unit may be installed or retrofitted without the use of tools, onto a variety of electrical equipment such as a bus bar, panel board, switchboards, switches or other electrical equipment.

The wireless, parasitically powered data processing unit may be configured to receive sensor signals from local sensors that are fastened to the current carrying conductor at locations that are of concern, for example at mechanical junctions of a bus where there may be corrosion or a loss of integrity. The sensor signals may be received from the sensors over wire connections, over optical fiber connections, or over a short range wireless link. The sensor signals are processed by the wireless, parasitically powered data processing unit. Information derived from the sensor signals may be wirelessly transmitted to remote receivers for further processing. The sensor signals may represent measurements of the physical condition of the current carrying conductor or another electrical device, for conditions such as temperature, humidity, vibration, or noise.

The wireless, parasitically powered data processing unit has: no need for batteries or a power supply voltage connection with the attendant costs, no need for extra wire in a constricted space, minimal installation costs, minimized potential mistakes during installation, and minimal product costs. Since there are no terminals or exposed wires, the wireless, parasitically powered data processing unit may be made very robust and essentially immune from electrical noise sources.

BRIEF DESCRIPTION OF THE DRAWINGS

Exemplary embodiments of the present disclosure are depicted in the accompanying drawings that are briefly described as follows.

DETAILED DESCRIPTION OF THE EXAMPLE EMBODIMENTS

Figures 1A, 1B, 1C, 1D, 1E, 1F, 1G:
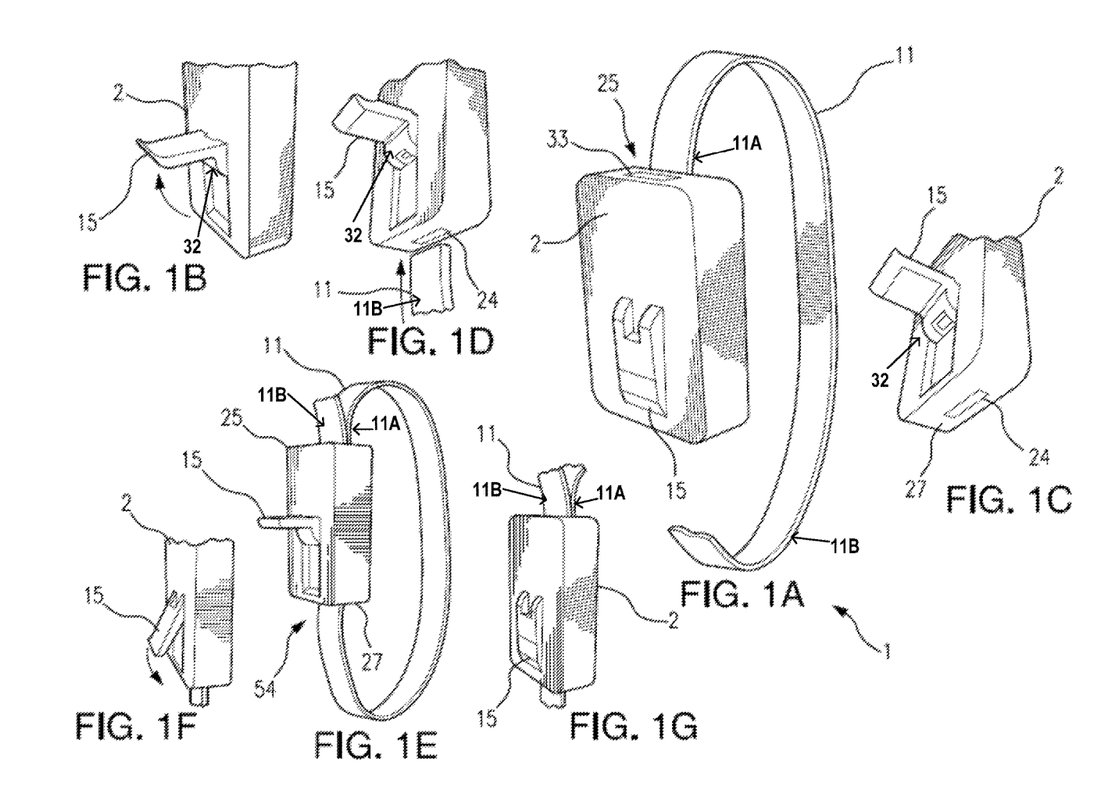
FIG. 1A illustrates a wireless, parasitically powered data processing unit that includes a housing and a flexible ferromagnetic belt that is configured to wrap around a current carrying conductor to secure the data processing unit onto the conductor and to form a magnetic loop to provide a ferromagnetic core for a transformer.
FIG. 1B illustrates the housing of FIG. 1A, with the clamping lever hingedly mounted on the housing in the open position.
FIG. 1C illustrates the housing of FIG. 1B, with the clamping lever in the open position and having a cam surface projecting into the housing.
FIG. 1D illustrates the housing and clamping lever of FIG. 1C, with a free end of the flexible ferromagnetic belt positioned for insertion into the housing.
FIG. 1E illustrates the housing, clamping lever, and flexible ferromagnetic belt of FIG. 1D, with the free end of the flexible ferromagnetic belt inserted through the housing.
FIG. 1F illustrates the housing, clamping lever, and flexible ferromagnetic belt of FIG. 1E, with the clamping lever being moved to the closed position.
FIG. 1G illustrates the housing, clamping lever, and flexible ferromagnetic belt of FIG. 1F, with the clamping lever in the closed position.
Figures 1H, 1I, 1J:
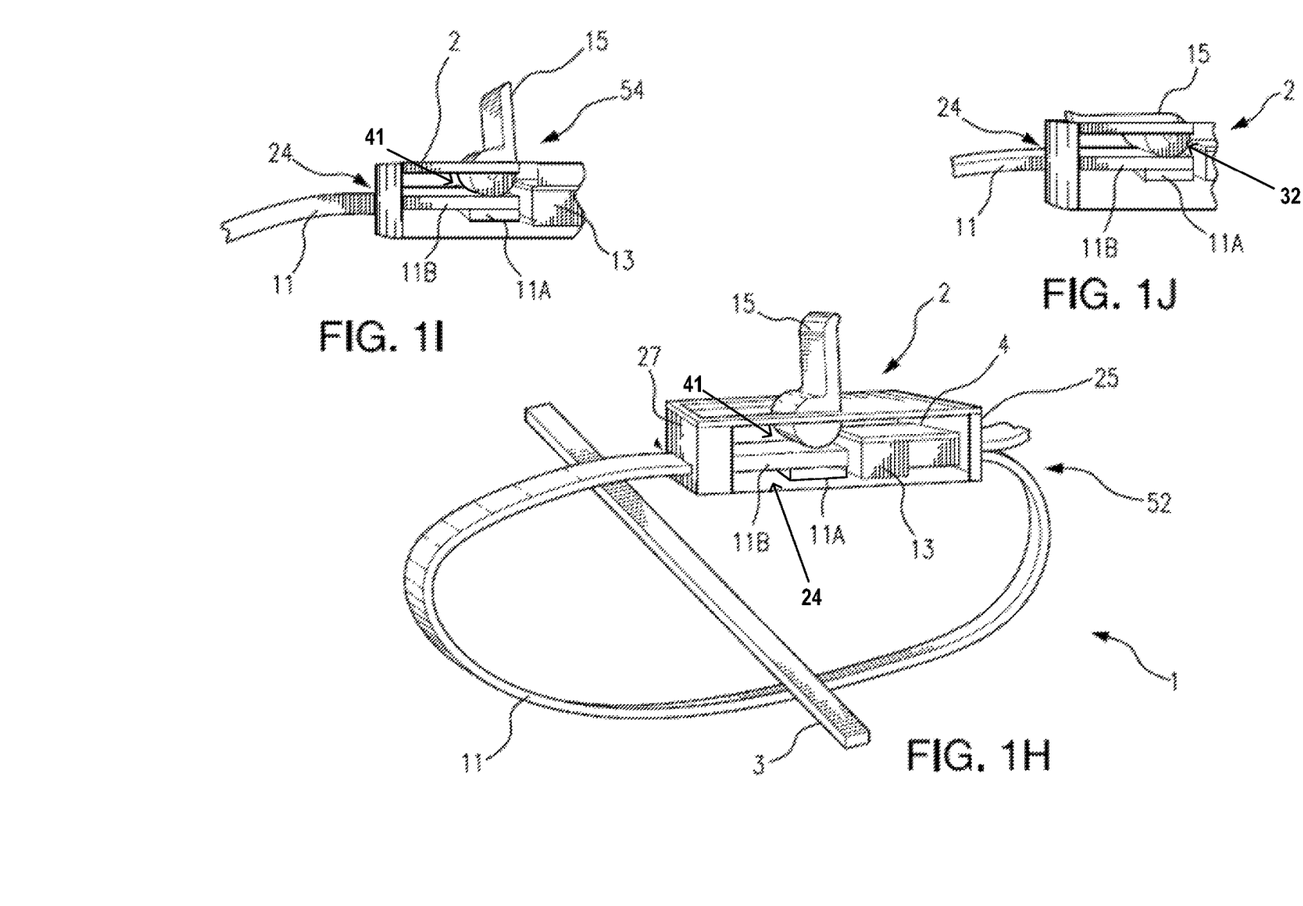
FIG. 1H illustrates a side view of the data processing unit of FIG. 1A with the side of the housing removed for clarity, and showing the clamping lever in the open position and the flexible ferromagnetic belt having been inserted through the housing. The clamping lever is shown superimposed above the flexible ferromagnetic belt. The clamping lever is shown in the open position where the cam surface forms a gap above the flexible ferromagnetic belt. The flexible ferromagnetic belt is shown wrapped around the current carrying conductor, with the free end of the flexible ferromagnetic belt inserted into the housing.
FIG. 1I illustrates a side view of the housing of FIG. 1H, with the clamping lever in the open position and the cam surface of the clamping lever being configured to clamp together the portions of the flexible ferromagnetic belt when the clamping lever is in the closed position.
FIG. 1J illustrates a side view of the housing of FIG. 1I, with the cam surface of the clamping lever being configured to clamp together the portions of the flexible ferromagnetic belt when the clamping lever is in the closed position so that the flexible ferromagnetic belt forms a transformer core to concentrate magnetic flux produced by the current carrying conductor and fastens the housing to the current carrying conductor.

FIG. 1A illustrates a case or housing 2 of a wireless, parasitically powered data processing unit 1. The housing 2 includes a mounting assembly configured to secure the housing 2 onto a current carrying conductor 3, shown in FIG. 1H, such as a bus bar or powerline. The mounting assembly includes a flexible ferromagnetic belt 11 having a portion configured to wrap around the current carrying conductor via an open loop of the belt 11, as shown in FIG. 1H, which provides a ferromagnetic core through a transformer in the housing 2 when the housing is secured onto the current carrying conductor. The housing 2 has a passageway 24, shown in FIG. 1C, which passes through the housing from a slot on the first side 25 (in FIG. 1A) to a slot on the second side 27 (in FIG. 1C). As further shown in FIG. 1A, the flexible ferromagnetic belt 11 has a fixed portion 11A fastened or arranged in the passageway 24 of the housing 2 and extending out from the slot on the first side 25 of the housing. The flexible ferromagnetic belt 11 has a free end 11B, opposite another free end or the fixed portion 11A, which is configured for insertion into the passageway 24 of the housing 2 through the slot on the second side 27 of the housing. The flexible ferromagnetic belt 11 may have two free ends 11A and 11B. The flexible ferromagnetic belt 11 performs the dual function of wrapping around the current carrying conductor 3 to secure the data processing unit 1 onto the conductor and also forming a magnetic loop when the data processing unit 1 is secured onto the conductor, to provide a ferromagnetic core for a transformer. The flexible ferromagnetic belt may be composed of ferrite.

FIG. 1B illustrates the housing 2 with a clamping assembly 54 which is configured to clamp two portions of the flexible ferromagnetic belt 11 together to secure the housing 2 onto the current carrying conductor. The clamping assembly 54 includes a clamping lever 15, which can be hingedly mounted on the housing 2. The clamping lever 15 has a cam surface 32 projecting into the passageway 24 of the housing 2 and superimposed above the fixed portion 11A of the flexible ferromagnetic belt 11. The clamping lever 15 has an open position shown in FIG. 1B, where the cam surface 32 forms a gap 41, shown in FIG. 1I, above the fixed portion 11A of the flexible ferromagnetic belt 11. The gap 41 is coincident with the passageway 24 in the housing 2.

FIG. 1C illustrates the housing 2 of FIG. 1B, and shows the clamping lever 15 in the open position and the cam surface 32 projecting into the passageway of the housing 2.

FIG. 1D illustrates the housing 2 and clamping lever 15 of FIG. 1C, and shows the free end 11B of the flexible ferromagnetic belt 11 positioned for insertion into the passageway 24 of the housing 2 through the slot in the second side 27 of the housing 2. The free end 11B of the flexible ferromagnetic belt 11 is configured to pass through the gap 41, shown in FIG. 1I, between the cam surface 32 of the clamping lever 15 in its open position and the fixed portion 11A of the flexible ferromagnetic belt 11. The free end 11B of the flexible ferromagnetic belt 11 is juxtaposed with the fixed portion 11A of the flexible ferromagnetic belt in the gap 41 beneath the cam surface 32 of the clamping lever 15, as shown in FIG. 1I.

FIG. 1E shows the free end 11B of the flexible ferromagnetic belt 11, having been inserted through the passageway 24 of the housing 2, exiting through the first side 25 of the housing 2.

FIG. 1F shows the clamping lever 15 being moved toward the closed position to clamp together the free end 11B of the flexible ferromagnetic belt 11 and the fixed portion 11A of the flexible ferromagnetic belt 11 when the clamping lever 15 is in the closed position, as shown in FIG. 1G. In the closed position, the flexible ferromagnetic belt 11 is configured to wrap around the current carrying conductor 3, shown in FIG. 1H, to fasten the housing 2 onto the current carrying conductor 3 and to form a ferromagnetic core of a transformer, to thereby concentrate magnetic flux produced by the current carrying conductor 3.

FIG. 1G illustrates the housing 2, clamping lever 15, and flexible ferromagnetic belt 11 of FIG. 1F, with the clamping lever 15 in the closed position.

FIG. 1H illustrates a side view of the housing 2 with the side removed for clarity to show exemplary components of the data processing unit 1. For example, the figure shows the clamping lever 15 in the open position and the flexible ferromagnetic belt 11 having been inserted through the passageway 24 of the housing 2. The clamping lever 15 is shown superimposed above the fixed portion 11A of the flexible ferromagnetic belt 11. The clamping lever 15 is shown in the open position where the cam surface 32 forms a gap 41 above the fixed portion 11A of the flexible ferromagnetic belt 11, the gap 41 being coincident with the passageway 24 in the housing 2. The flexible ferromagnetic belt 11 is shown wrapped around the current carrying conductor 3, with the free end 11B of the flexible ferromagnetic belt 11 inserted into the passageway 24 of the housing 2 through the slot in the second side 27 of the housing 2. The ferromagnetic belt 11 can be tightened around the current carrying conductor 3 to secure the housing 2 onto the current carrying conductor 3.

FIG. 1I illustrates a side view of the housing 2 of FIG. 1H, showing the clamping lever 15 in the open position. The cam surface 32 of the clamping lever 15 is configured to clamp together the free end 11B of the flexible ferromagnetic belt 11 and the fixed portion 11A of the flexible ferromagnetic belt 11 when the clamping lever 15 is moved to the closed position shown in FIG. 1J. In the closed position, the flexible ferromagnetic belt 11 is configured to thereby form a transformer core to concentrate magnetic flux produced by the current carrying conductor 3. The flexible ferromagnetic belt 11 is also configured to thereby fasten the housing 2 to the current carrying conductor 3.

FIG. 1J illustrates a side view of the housing 2 of FIG. 1I, in which the cam surface 32 of the clamping lever 15 is configured to clamp together the free end 11B of the flexible ferromagnetic belt 11 and the fixed portion 11A of the flexible ferromagnetic belt 11 when the clamping lever 15 is in the closed position. The flexible ferromagnetic belt 11 is configured to thereby form a transformer core and to fasten the housing 2 to the current carrying conductor 3. The flexible ferromagnetic belt 11 performs the dual function of wrapping around the current carrying conductor 3 to secure the data processing unit 1 onto the current carrying conductor 3 and also form a magnetic loop when the data processing unit 1 is secured onto the current carrying conductor 3, to provide a ferromagnetic core for the transformer 13.

Figure 2:
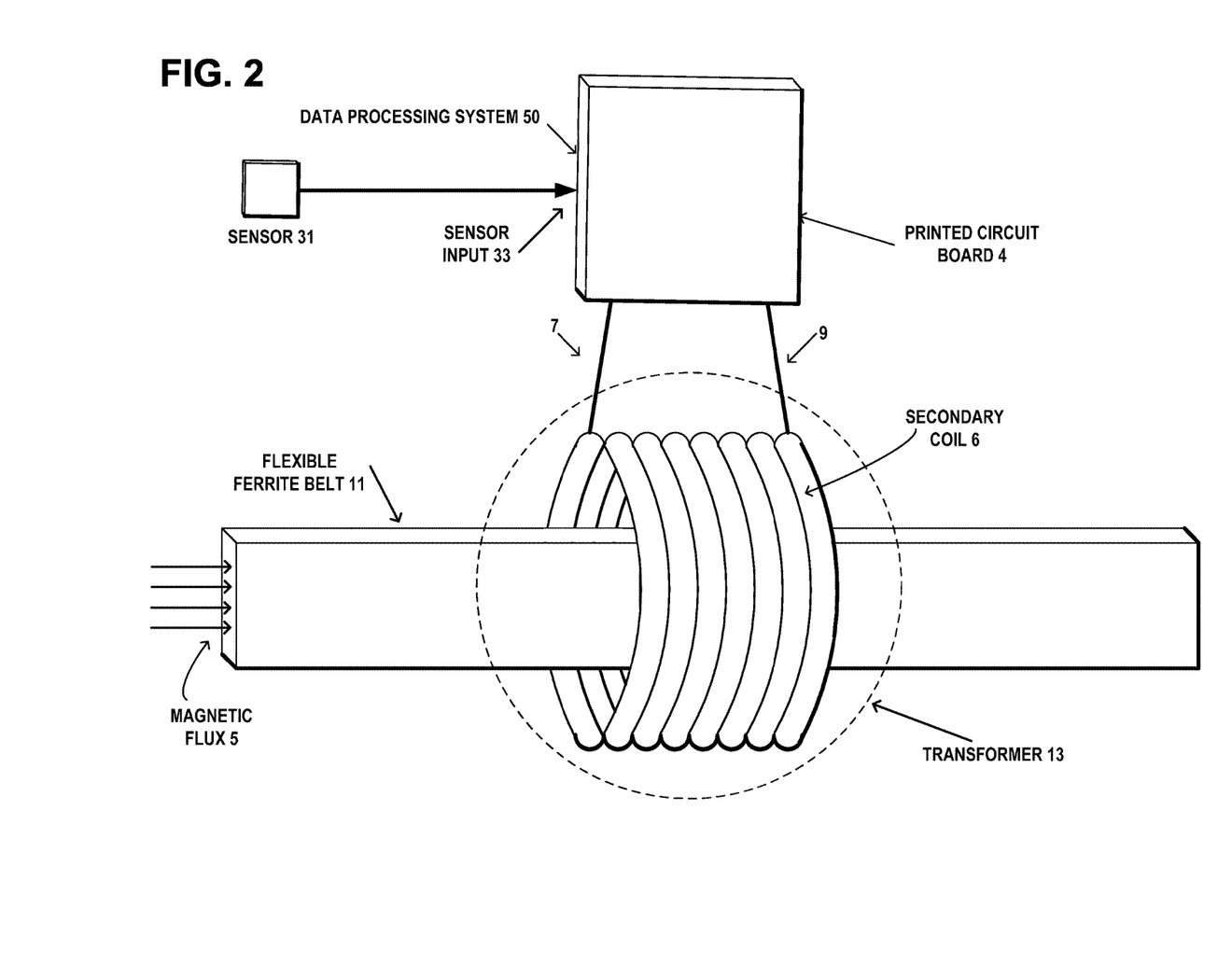
FIG. 2 illustrates an example of the transformer of FIG. 1H in the housing, which includes the secondary coil through which the flexible ferromagnetic belt passes. The coil is configured to magnetically couple the magnetic flux produced in the flexible ferromagnetic belt by the current carrying conductor, when the clamping lever is in the closed position.

FIG. 2 illustrates an example of the transformer 13 in the housing 2. The current carrying conductor 3 of FIG. 1H, constitutes a single-turn primary coil for the transformer 13. The transformer 13 includes a secondary coil 6 through which the flexible ferromagnetic belt 11 passes. The secondary coil 6 is configured to magnetically couple the magnetic flux 5 produced in the flexible ferromagnetic belt 11 by the current carrying conductor 3, when the clamping lever 15 is in the closed position, as shown in FIG. 1J. FIG. 2 further shows a data processing system 50 that is arranged in the housing 2 and configured to receive signals from a sensor 31 at a sensor input 33. The data processing system 50 may be embodied as a data processing device mounted on a printed circuit board 4 in the housing 2. The data processing system 50 is coupled to the transformer 13 by means of the leads or wires 7 and 9. The data processing system 50 includes a data collection circuit 51, (FIG. 3) to collect data from one or more sensors 31, and a wireless transmitter 22 (FIG. 3), which are configured to receive their operational power from the transformer 13 via an energy harvesting circuit 40.

The sensor 31 may be a thermal sensor that may monitor thermal performance on any electrical device. Thermal performance is strongly related to mechanical junction performance on electrical conductors such as cables, wires, bus bars, connectors, etc. If mechanical junctions start to lose integrity, their temperature will start to rise due to the increased resistance in the junction, which will cause dissipation of heat. The monitoring of temperature rise in electrical conductors with mechanical junctions helps in the performance of preventive maintenance in reducing personal risk to operators when handling the "live" equipment for thermography analysis.

The wireless, parasitically powered data processing unit 1 collects readings from different sensors 31 installed on an electrical device, such as joints of the current carrying conductor 3. Several sensors 31 may be installed in different phase bus bars or conductors 3 and the wireless, parasitically powered data processing unit 1 may collect readings from each phase bus bar. The wireless, parasitically powered data processing unit 1 then wirelessly transmits the collected data via a wireless transceiver to wireless receivers for further processing, based on the received sensor signals. The data may be from thermal sensors installed in the mechanical junctions of the electrical conductors. The data may also be from humidity, noise, or vibration sensors, for example.

The wireless, parasitically powered data processing unit 1 is self-powered and does not require external batteries. The wireless, parasitically powered data processing unit 1 is able to obtain or harvest the energy required for operational power from the same current carrying conductor 3 upon which the unit is installed. Accordingly, the wireless, parasitically powered data processing unit is maintenance free, and is easy to install and to retrofit.

Figure 3:
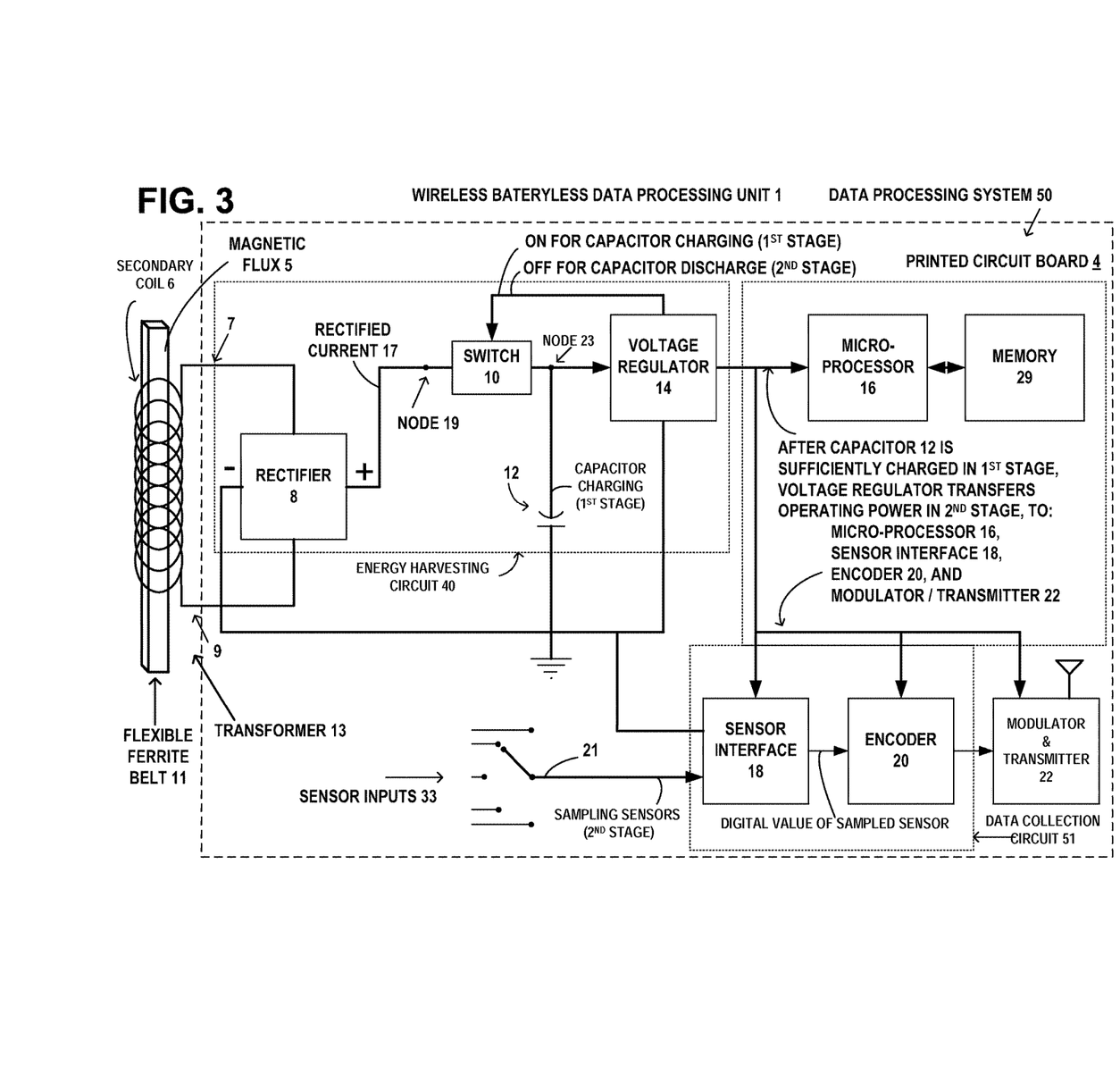
FIG. 3 illustrates an exemplary embodiment of a printed circuit board in the housing of the data processing unit of FIG. 1. The magnetic flux concentrated in the flexible ferrite belt, induces an alternating current in the secondary coil by means of electromagnetic induction. The transformer thus formed is used to supply power to the data processing unit from the current carrying conductor, thereby eliminating the need for a battery.

FIG. 3 illustrates an example of the printed circuit board 4 in the housing 2 of the electrical unit or wireless, parasitically powered data processing unit 1, which does not require a battery for its operation. In this example, the printed circuit board 4 of the electrical system or data processing system 50 may include an energy harvesting circuit 40, a data processing device such as a micro-processor 16 (in communication with a memory 29), a data collection circuit 51 to collect data from one or more sensors 31, and a wireless transceiver 22. The data collection circuit 51 includes a sensor interface 18 and an encoder 20. The sensor interface 18 is configured to receive sensor signals 33 (also referred to as "sensor inputs") from one or more sensors 31 (not shown). The sensor interface 18 is configured to provide the received sensor signals to the micro-processor 16.

The wireless transceiver 22 (also referred to as "transmitter" or "modulator and transmitter") is configured to receive processed data from the micro-processor 16. The wireless transceiver 22 is configured to wirelessly transmit the processed data to wireless receivers. The micro-processor 16 is configured to generate the processed data based on the received sensor signals 33. The sensor signals 33 may represent measurements of a physical condition of an electrical device, the physical condition being, e.g., temperature, humidity, vibration, or noise. The sensor signals 33 may represent measurements of the temperature or vibration of the current carrying conductor 3. The data processing system 50 may receive sensor signals 33 over a communications medium such as an electrical wire medium, an optical fiber medium, or a wireless radio frequency medium.

The components of the data processing system 50 such as the micro-processor 16, the sensor interface 18, the encoder 20 and the wireless transceiver 22, are configured to receive their operational power from the transformer 13 via the energy harvesting circuit 40. For example, magnetic flux 5, which is concentrated in the flexible ferrite belt 11, induces an alternating current in the secondary coil 6 by means of electromagnetic induction. The transformer 13, thus formed, is used to supply power to the data processing system 50 from the current carrying conductor 3, thereby eliminating the need for a battery. In this example, the leads 7 and 9 conduct the induced alternating current in the secondary coil 6 of the transformer 13 to the energy harvesting circuit 40, which in turn supplies operational power to the other components of the data processing system 50.

The energy harvesting circuit 40 includes a rectifier 8 connected to the leads 7 and 9. The rectifier 8 outputs the rectified current 17 to the node 19. The energy harvesting circuit 40 also includes a switch 10 connected between the node 19 and a node 23. The node 23 is connected to a capacitor 12 and a voltage regulator 14.

During a first stage of operation, the switch 10 is turned ON to conduct the rectified current 17 to the capacitor 12, which in turn charges the capacitor. The data processing system 50 manages the charging of the capacitor 12 with the rectified current 17 from the current induced in the secondary coil 6. Impedance represented by the sensor interface 18, limits the portion of the rectified current 17 diverted from charging the capacitor 12. Therefore, in the first stage, the sensor interface 18 is not powered and thus not operational.

As the capacitor 12 is charged during the first stage of operation, the voltage on node 23 increases. The voltage regulator 14, connected to the node 23, is configured to sense when the voltage on node 23 indicates that the capacitor 12 has been charged to a predetermined threshold value. When the voltage on node 23 reaches or satisfies the predetermined threshold value, the voltage regulator 14 is configured to provide output power to the micro-processor 16, the sensor interface 18, the encoder 20, and the wireless transceiver 22. When the voltage on node 23 reaches the predetermined threshold value, this indicates a transition to the second stage of operation. In the second stage of operation, the voltage regulator 14 sends a switching signal to turn OFF the switch 10 to stop conducting the rectified current 17 to the node 23 and thus to discontinue the charging of the capacitor 12. The sensor interface 18, the encoder 20 and the wireless transceiver 22 are now receiving operating power from the voltage regulator 14.

The sensor interface 18 samples at node 21, the sensor inputs 33 from one or more sensors 31 during the second stage. The sensor interface 18 may sequentially sample two or more sensors 31 and output their digital values representing the sensor signals. The encoder 20 receives the digital value from the sensor interface 18, and encodes the digital value for transmission by the modulator and transmitter 22 during the second stage. The wireless transceiver 22 transmits the digital value to a receiver that may be located elsewhere, to provide information characterizing the sensor signals.

The wireless transceiver 22 may transmit the digital value to the receiver by means of at least one of radio frequency electromagnetic signals, ultrasonic signals, visible light signals, and infra-red light signals. An exemplary transceiver 22 may be a Bluetooth™ Low Energy (LE) transmitter/ receiver that is capable of operating at low power levels. The receiver may be a radio relay that forwards the sensor signal values to a network. The information may be used to set an alarm, analyze energy consumption, stored for future use, or transmitted to a network such as the Smart Grid.

As the charge on the capacitor 12 dissipates during the second stage, the voltage regulator 14 senses a reduction in the operational power. At a predefined operational power level, the voltage regulator 14 sends a switch signal to turn on the switch 10 to conduct the rectified current 17 to recharge the capacitor 12. This returns the data processing system 50 to the first stage, removing the operational power from the sensor interface 18, the encoder 20, and the wireless transceiver 22. The data processing system 50 repeatedly cycles between the first stage of charging the capacitor 12 and the second stage of providing operational power to collect sensor signals and transmit the information to a network, for example.

In alternate example embodiments of the invention, the energy requirements of the micro-processor 16, memory 29, wireless transmitter 22, sensor interface 18 and encoder 20 may be sufficiently low to be continuously supplied by the rectified current 17 at node 19.

In alternate example embodiments of the invention, the printed circuit board 4 of FIG. 3, may be populated with an energy harvester integrated circuit 40 to supply power to the data processing system 50 from the magnetic flux 5 in the flexible ferrite belt 11.

Although specific example embodiments of the invention have been disclosed, persons of skill in the art will appreciate that changes may be made to the details described for the specific example embodiments, without departing from the spirit and the scope of the invention.

What is claimed is:

1. A wireless, parasitically powered data processing unit to be secured onto a current carrying conductor, comprising:
    a data processing system configured to receive signals from a sensor;
    a transformer configured to supply power to the data processing system from the current carrying conductor;
    a housing for the data processing system and transformer, the housing including a mounting assembly configured to secure the housing onto the current carrying conductor, the mounting assembly including a flexible ferromagnetic belt having a portion configured to wrap around the current carrying conductor and secure the housing onto the conductor via a loop providing a ferromagnetic core through the transformer when the housing is secured onto the current carrying conductor;
    a clamping assembly in the housing, the clamping assembly being configured to clamp two portions of the flexible ferromagnetic belt so that the two portions are mutually overlapped and touching, to secure the housing onto the current carrying conductor and form a magnetic loop, without needing specialized installation tools;
    a data processing device configured to receive its operational power from the transformer; and
    a sensor interface coupled to the transformer, the sensor interface being configured to receive its operational power from the transformer, the sensor interface further being configured to receive sensor signals from one or more sensors and provide the sensor signals to the data processing device.

2. The wireless, parasitically powered data processing unit of claim 1, wherein the clamping assembly comprises:
    a clamping lever hingedly mounted on the housing, the clamping lever having a cam surface projecting into the housing and being superimposed above the ferromagnetic belt, the clamping lever having an open position where the cam surface forms a gap above the flexible ferromagnetic belt.

3. The wireless, parasitically powered data processing unit of claim 2, wherein the flexible ferromagnetic belt is configured to pass through the gap under the cam surface of the clamping lever in its open position, the cam surface of the clamping lever being configured to clamp the two portions of the flexible ferromagnetic belt together to form a magnetic loop, when the clamping lever is moved to a closed position.

4. The wireless, parasitically powered data processing unit of claim 3, wherein the transformer further comprises:
    a coil in the housing through which the flexible ferromagnetic belt passes, the coil being configured to magnetically couple the magnetic flux concentrated in the flexible ferromagnetic belt to the coil to provide an induced current from which to provide operational power to the data processing system.

5. The wireless, parasitically powered data processing unit of claim 1, wherein the flexible ferromagnetic belt has two free ends.

6. The wireless, parasitically powered data processing unit, of claim 1, further comprising:
    a wireless transceiver coupled to the transformer, the wireless transceiver being configured to receive its operational power from the transformer, the wireless transceiver being further configured to receive processed data from the data processing device and to wirelessly transmit the processed data to wireless receivers,
    wherein the data processing device is configured to generate the processed data based on the received sensor signals.

7. The wireless, parasitically powered data processing unit, of claim 1, wherein the sensor signals represent measurements of a temperature of the current carrying conductor.

8. The wireless, parasitically powered data processing unit, of claim 1, wherein the sensor signals are selected from the group comprising representations of humidity, representations of vibration of the current carrying conductor, and representations of noise.

9. The wireless, parasitically powered data processing unit, of claim 1, wherein the data processing system receives sensor signals over a communications medium selected from one of an electrical wire medium, an optical fiber medium, or a wireless radio frequency medium.

10. The wireless, parasitically powered data processing unit, of claim 1, wherein the flexible ferromagnetic belt is composed of ferrite.

11. A parasitically powered electrical unit to be secured onto a current carrying conductor, comprising:
    a transformer configured to supply power to an electrical system from the current carrying conductor;
    a housing for the transformer, the housing including a mounting assembly configured to secure the housing onto the current carrying conductor, the mounting assembly including a flexible ferromagnetic belt having a portion configured to wrap around the current carrying conductor and secure the housing onto the conductor via a loop providing a ferromagnetic core through the transformer when the housing is secured onto the current carrying conductor;

a clamping assembly in the housing, the clamping assembly being configured to clamp two portions of the flexible ferromagnetic belt so that the two portions are mutually overlapped and touching, to secure the housing onto the current carrying conductor and form a magnetic loop, without needing specialized installation tools;

a data processing device coupled to the transformer, the data processing device being configured to receive its operational power from the transformer; and a sensor interface coupled to the transformer, the sensor interface being configured to receive its operational power from the transformer, the sensor interface further being configured to receive sensor signals from one or more sensors and provide the sensor signals to the data processing device.

12. The parasitically powered electrical unit of claim 11, wherein the flexible ferromagnetic belt is composed of ferrite.

13. The parasitically powered electrical unit of claim 11, wherein the electrical system is a data processing system included in the housing.

14. The parasitically powered electrical unit, of claim 11, further comprising:

a wireless transceiver coupled to the transformer, the wireless transceiver being configured to receive its operational power from the transformer, the wireless transceiver being further configured to receive processed data from the data processing device and to wirelessly transmit the processed data to wireless receivers, wherein the data processing device is configured to generate the processed data based on the received sensor signals.

* * * * *